United States Patent [19]

Shoemaker

[11] Patent Number: 4,681,439

[45] Date of Patent: Jul. 21, 1987

[54] PIPE LAYING METHOD AND APPARATUS

[76] Inventor: Jack W. Shoemaker, 9430 Woodsboro Pike, Walkersville, Md. 21793

[21] Appl. No.: 791,871

[22] Filed: Oct. 28, 1985

[51] Int. Cl.$^4$ .............................................. G01B 11/26
[52] U.S. Cl. ..................................... 356/154; 33/286; 33/293
[58] Field of Search .................. 33/286, 293, 294–296; 356/153, 154

[56] References Cited

U.S. PATENT DOCUMENTS

| | | | |
|---|---|---|---|
| 3,528,747 | 9/1970 | Walsh | 356/154 |
| 3,572,942 | 3/1971 | teKronnie et al. | 356/154 |
| 3,599,336 | 8/1971 | Walsh | 33/46 |
| 3,631,601 | 1/1972 | McNulty | 356/153 |
| 3,742,581 | 7/1973 | Roodvoeis | 29/407 |
| 3,857,639 | 12/1974 | Mason | 356/156 |
| 3,879,132 | 4/1975 | Myeress | 356/153 |
| 3,907,435 | 9/1975 | Roodvoets | 356/153 |
| 4,030,832 | 6/1977 | Rando | 33/293 |
| 4,155,648 | 5/1979 | Ferguson | 356/140 |
| 4,272,191 | 6/1981 | Bergkvist | 356/153 |

Primary Examiner—F. L. Evans
Attorney, Agent, or Firm—Henderson & Sturm

[57] ABSTRACT

A method and apparatus (10) employed to give the operator of excavating equipment a quick and accurate visual indication of the amount of excavation required to attain a desired grade level; wherein, the apparatus (10) comprises: a laser unit (11); a representative pipe section (12); a centerline target unit (13); and, a grade checker unit (15), whereby the coincidence of a laser beam (50) projected from the laser unit (11) and selected portions of a stationary target element (16) and an adjustable target element (27) on the centerline target unit (13) and the grade checker unit (15) respectively determines the desired grade depth.

12 Claims, 9 Drawing Figures

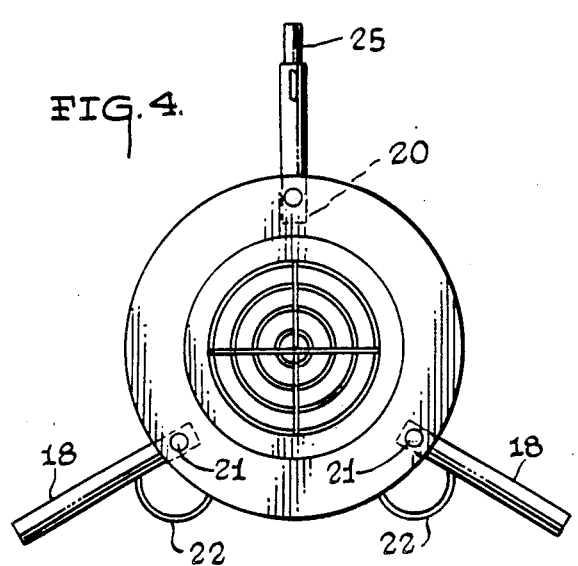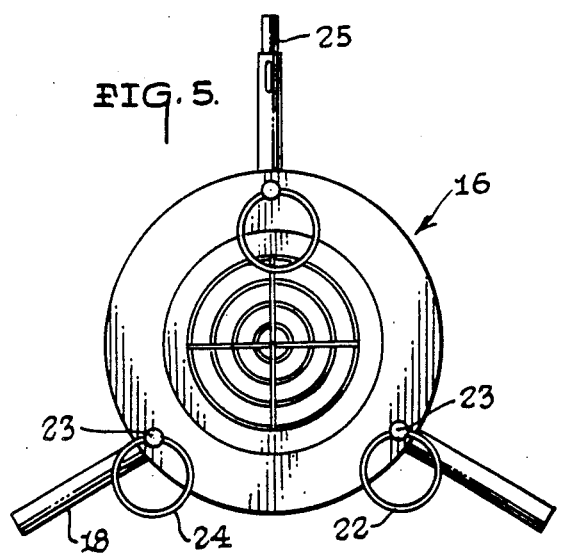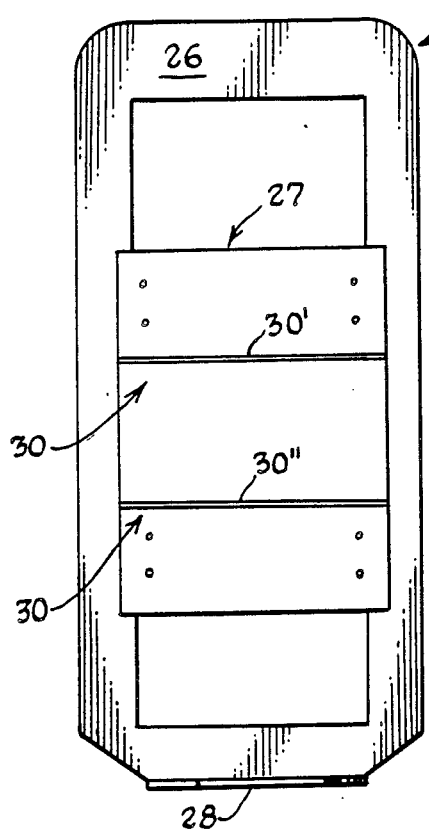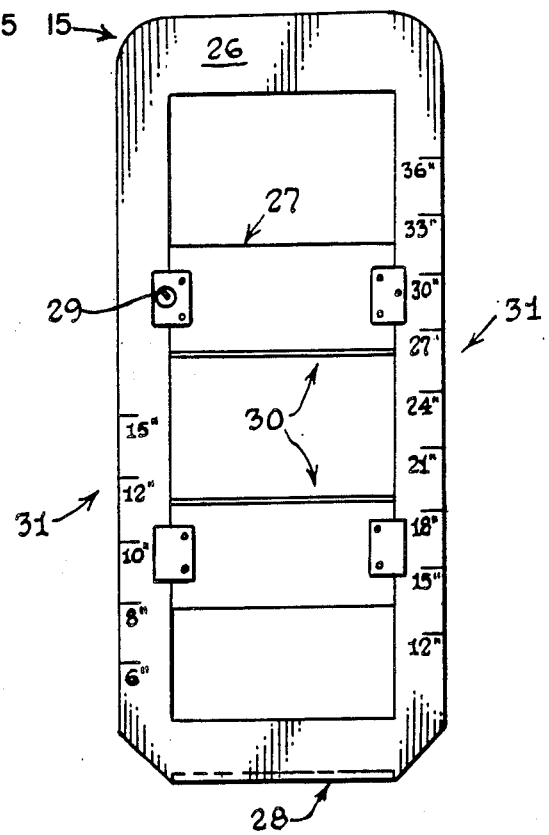

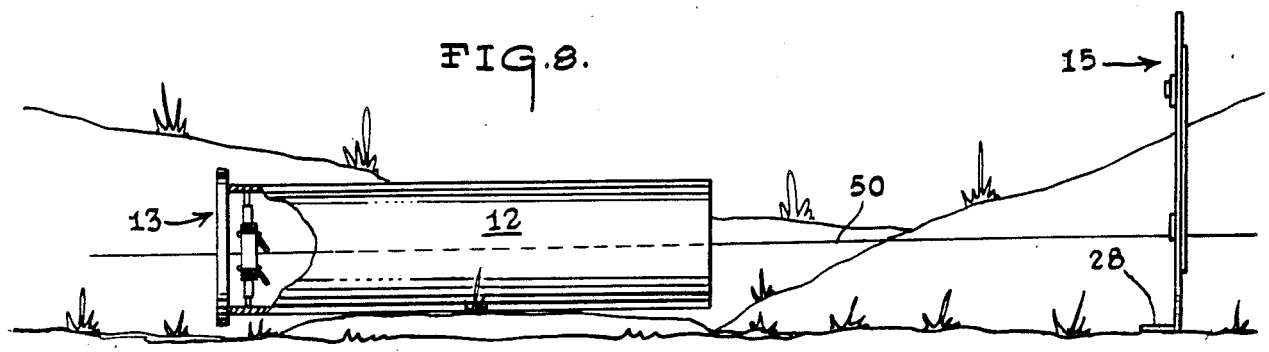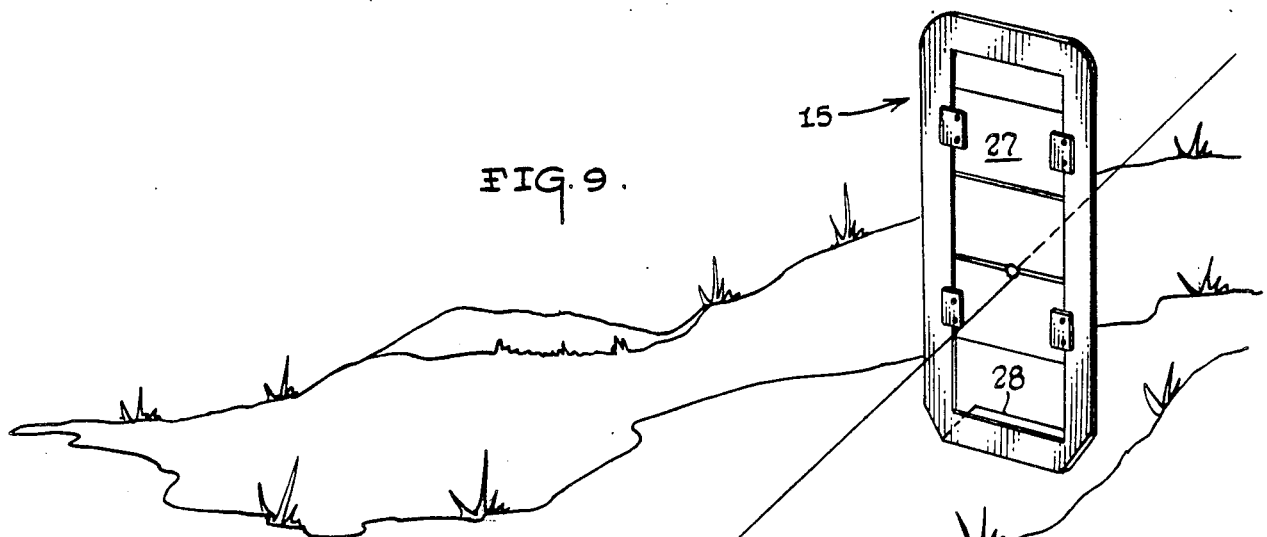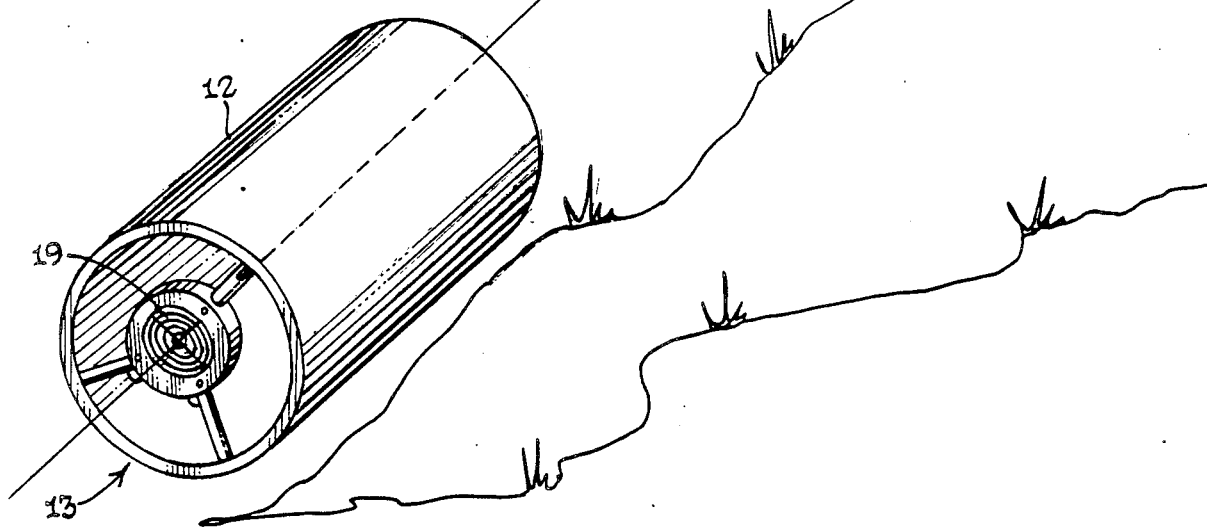

4,681,439

PIPE LAYING METHOD AND APPARATUS

TECHNICAL FIELD

The present invention relates generally to pipe laying methods and apparatus used in conjunction therewith.

BACKGROUND OF THE INVENTION

As can be seen by reference to U.S. Pat. Nos: 3,599,336; 3,907,435; 3,742,581 and 3,879,132, the prior art is replete with diverse visual target and alignment systems for determining, verifying, and/or adjusting a moveable item with respect to a stationary columnated point of reference such as a laser beam or the like.

While the aforementioned prior art methods and apparatus are only representative of the various arrangements to found in the patent literature; they also more than adequately reflect some of the more common structural and functional deficiencies that are shared in whole or in part by this body of prior art.

To begin with most of the alignment methods and apparatus involve very complex structural arrangements used to accurately align individual pipe segments in a sequential fashion. While this general concept no doubt produces very accurate results, it also consumes a great deal of time and manpower.

By accepting the basic premise that the general concept was valid in theory; but, misapplied in actual practice, it became obvious that a more efficient way of implementing the general concept could be developed, that would dramatically reduce the time and manpower requirements attendant upon the prior art methods and apparatus, while still producing an end result that very closely approaches the tolerances achieved by the prior art methods.

It also became obvious that in order to achieve the desired objectives, it would be necessary to utilize some if not all of the broad structrual components found in most of the prior art methods; however, these components would have to be modified and utilized for the most part in a very different fashion than had been the case heretofore.

The method and apparatus that forms the basis of this invention represents the culmination of the aforementioned rethinking process, and represents a unique, relatively simply, and comparatively very rapid method and apparatus for laying pipe.

SUMMARY OF THE INVENTION

Briefly stated the present invention structurally comprises: a laser unit; a representative pipe section; a centerline target unit; support means; and, a grade checker unit, which are used in combination with one another to practice the method of this invention.

As mentioned previously the basic concept from both a functional and structural standpoint are generally represented by the prior art; however, the specific construction of the components, and their particular method of use are not believed to be either taught or suggested by the prior art:

In essence, the method proceeds as follows: the laser unit generates a focused beam of light at a preselected height representative of the desired axial disposition of a pipe string; the centerline target is inserted into a representative pipe section, wherein the centerline target assumes a generally self centering position relative to the longitudinal axis of the pipe section; the lead pipe section is then disposed on the support means such that the laser beam will impinge upon and pass through a stationary target surface on the centerline target, so that the variance between the actual and desired grade may be established; in as much as, the support means chosen is selected in accordance with the depth of backfill required above the actual grade.

Once the lead pipe section has been positioned in axial coincidence with the laser beam; the grade checker unit is deployed such that an adjustable target surface is positioned a pre-slected distance from the bottom of grade checker unit; and, then the grade checker unit is translated along the path of the laser beam, to determine the extent of additional excavation required along the pipe string run.

By virtue of this arrangement the operator of the excavating equipment only needs one assistant to move the grade checker at spaced intervals along the pipe trench; and, the operator will have a ready visual reference of how close he is to the desired grade by noting the location of the point of impingement of the laser beam on the adjustable target surface of the grade checker unit.

BRIEF DESCRIPTION OF THE DRAWINGS

These and other objects, advantages, and novel features of the method and appartus embodied in this invention will become apparent from the detailed description of the best mode for carrying out the invention which follows; particularly when considered in conjunction with the accompanying drawings; wherein:

FIG. 4 is a front elevational view of the centerline target unit;

FIG. 5 is a rear elevation view of the centerline target unit;

FIG. 6 is a front elevation view of the grade checker unit;

FIG. 7 is a rear elevation view of the grade checker unit;

FIG. 8 is a side elevation view of the grade checker unit in use; and

FIG. 9 is an enlarged perspective view of the grade checker unit in use.

BEST MODE FOR CARRYING OUT THE INVENTION

Figure 1:
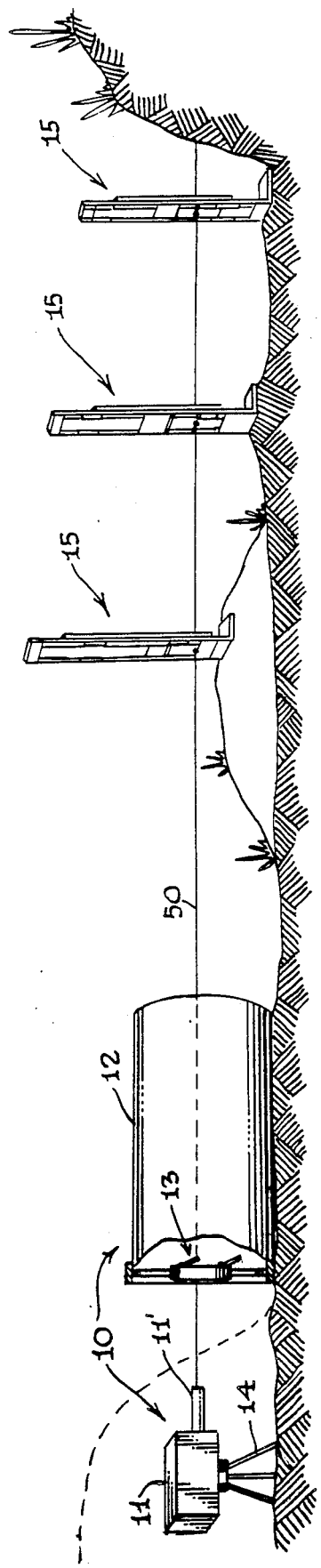
FIG. 1 is a perspective view depicting the apparatus as it is used to practice the method of this invention.

As can be seen from the drawings, and in particular by reference to FIG. 1, the apparatus that is used to practice the method of this invention is designated generally by the reference numeral (10). The apparatus (10) comprises in general a laser unit (11), a representative pipe section (12); a centerline target unit (13) support means (14); and, a grade checker unit (15). These units will now be described in seriatim fashion.

The laser unit (11) is an acknowledged prior art component; and any suitable position adjustable laser generating device (11') capable of producing a focused laser beam may be used to practice the method of this invention. The pipe section (12) also constitutes well recognized and accepted structure; and, the only characteristic required of this pipe section in order to carry out the method of this invention, being that the pipe section (12) chosen be representative of all of the pipe sections contemplated for use in the pipe string to be layed.

Figure 3:
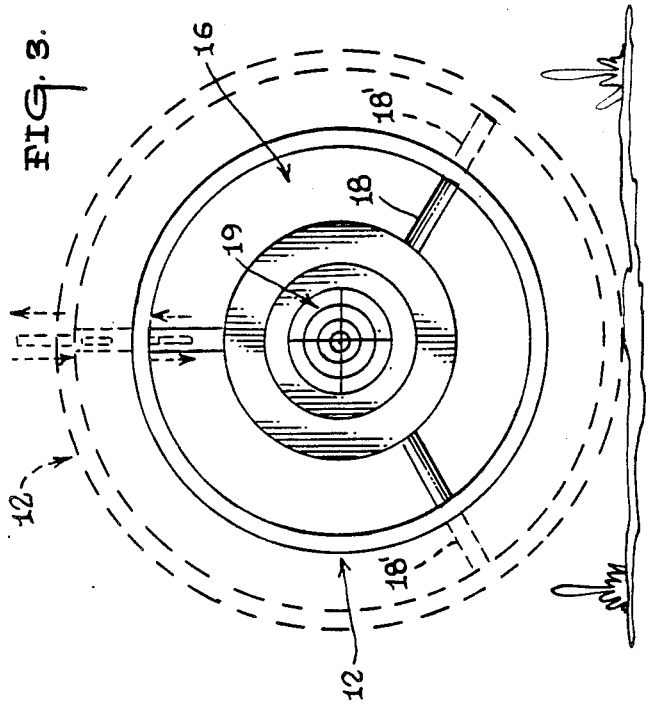
FIG. 3 is a front elevational view of the centerline target modified to accomodate pipe sections of differing diameters.
Figure 2:
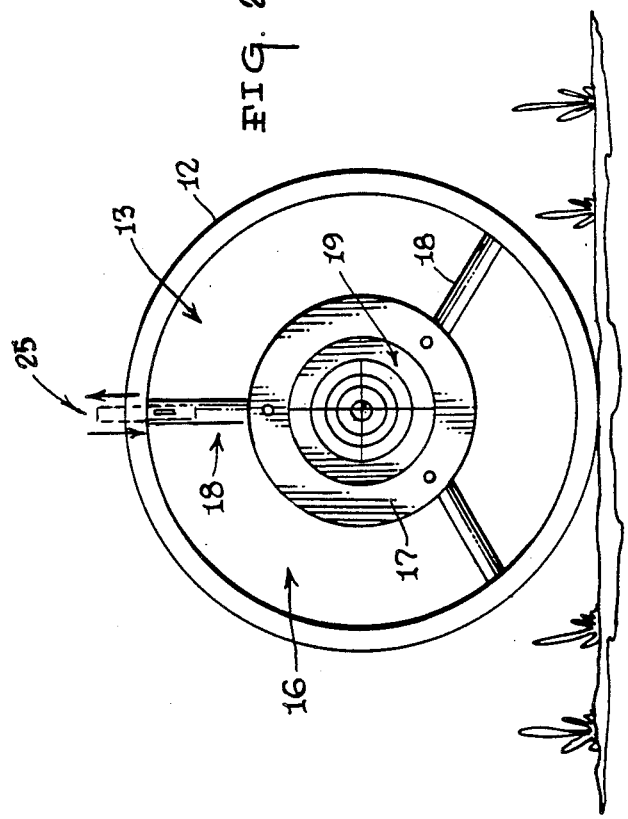
FIG. 2 is a front elevational view of the centerline target disposed in a pipe section.

As can best be seen by reference to FIGS. 2 thru 4, the centerline target unit (13) comprises a fixed or stationary target element (16) surrounded by a circular rigid housing member (17) provided with a plurality of equidistantly spaced leg members (18) around its periphery. The stationary target element (16), is further provided with a target pattern (19) on its surface comprising a series of concentric rings intersected by vertical and horizonal cross-hairs; and, the material from which the target element is fabricated is chosen from a class of material capable of distortion free passage of a focused laer beam (50).

As can best be seen by reference to FIGS. 4 and 5, the rigid housing member (17) is provided on its periphery, with a plurality of enlarged recesses (20) (shown in phantom) that are dimensioned to slidingly receive said plurality of leg members (18); and, a like plurality of apertures (21) extending through said recesses (20) and dimensioned to slidingly receive releasable leg securing elements (22) that extend through suitably dimensioned apertures in each of the leg members (18).

The releasable leg securing elements (22) shown in the drawings comprise a post (23) and ring (24) securing arrangement; however, it is to be understood that any suitable leg securing arrangement could be substutited therefore.

As can also by seen by reference to drawing FIGS. 2 thru 5, at least one of the plurality of leg members (18) is provided with an axially extensible element (25) capable to reciprocation with respect to at least one leg member (18) for the purpose of increasing the effective length thereof.

The purpose and function of the extensible element (25) is best depicted in FIGS. 2 and 3; wherein it can be seen that in those instances when the pipe diameter slightly exceeds the minimum radial displacement of the leg members (18), the extensible element (25) will compensate for this variance, while still positioning the center of the stationary target element (16) in close proximity to the longitudinal axis of the pipe section (12).

Obviously, a point will be reached wherein the extensible element (25) cannot compensate for the difference between the pipe diameter and the effective length of a given set of leg members (18); and, this invention contemplates the provision of sets of leg members (18), wherein each set (18) (18') of leg members is capable of accommodating different internal diameter pipe lengths within a given range. As shown in FIG. 3, the same stationary target element (16) may be employed with different sets of leg members (18) and (18'), by simply removing the releasable leg securing element (22) from the stationary target element (16) and substituting one set (18') of leg members for another set (18) of leg members.

As can best be seen by reference to FIGS. 6 and 7 the grade checker unit (15) comprises an elongated generally rectangular open framework member (26) having an adjustable target element (27), mounted for relative motion with respect thereto. In addition, the framework member (26) is further provided with a generally horizontally disposed foot portion (28) on its bottom surface.

The adjustable target element (27) is fabricated from the same type of material that was chosen for the stationary target element (16); and, is further provided with releasable locking means (29) for securing the adjustable target element at various locations along the vertical length of the open framework member (26). In addition, the adjustable target element is further provided with at least one horizontally disposed reference line (30); and, the vertical sides of the framework member (26) are provided with indicia (31) representative of length, whereby the relative distance beween the at least one reference line (30) and the bottom of the framework member (26) may be accurately determined.

In the embodiment illustrated in FIGS. 6 and 7, the adjustable target element (27) is provided with a plurality of reference lines (30) wherein the upper reference line (30') is representative of the desired axial height of the representative pipe section (12); and, the lower reference line (30") is representative of the position of the lowest external dimension of the pipe section (12).

As previously described herein the method of use of the apparatus (10) of the invention proceeds as follows: The laser unit (11) is positioned such that the laser beam (50) will transcribe the desired height and direction of the longitudinal axis of the pipe string. Once the reference beam has been established the centerline target unit (13) is inserted into a representative pipe secton (12). The pipe section (12) is then positioned, such as by support means (14), so that the laser beam (50) impinges on the center of the stationary target element (16). Given the amount of backfill that is called for, above the actual grade for a given project, the adjustable target element (27) on the grade checker unit (15) is positioned such that when the laser beam coincides with at least one selected reference line (30) on the adjustable target element (27) the foot portion (28) of the grade checker unit (15) will coincide with the depth of the desired actual grade.

It should further be noted that through experimentation, it has been discovered that in choosing the material, from which both the stationary target surface (16) and the moveable target surface (27) are fabricated; it is very desireable to choose a material capable of being pigmented or otherwise infused with the color purple. The reason for this being that the contrast between the standard red colored laser beam (50) and the purple colored target surfaces (16) and (26) makes the point of impingement of the laser beam on the target surface extremely easy for the equipment operator to visually detect even at relatively long distances.

Having thereby described the subject matter of this invention, it should be apparent that many substitutions, modifications, and variations of the invention are possible in light of the above teachings. It is therefore to be understood that the invention as taught and described herein is only to be limited to the breadth and scope of the appended claims.

I claim:

1. An apparatus in combination with an adjustable laser beam generating device and a representative section of pipe, wherein the apparatus is used to establish a visual reference for the operator of excavating equipment of the amount of additional excavation needed to meet the grade requirements for laying a pipe string wherein the apparatus comprises:

a centerline target unit comprising a stationary target element surrounded by a rigid housing member having a plurality of spaced leg members wherein at least one of the plurality of leg members is provided with an axially extensible element, whereby the stationary target unit may be releasably received within representative sections of pipe having diameters within a given range; and, a grade checker unit comprising an elongated generally rectangular open framework element, having an adjustable target element mounted for relative movement with respect thereto, and a generally horizontally disposed foot portion on the bottom surface of the framework element; wherein the vertical sides of said framework member are provided with indicia representative of length, whereby the relative distance between the adjustable target element and the bottom of the framework member may be accurately determined.

2. An apparatus as in claim 1 wherein said rigid housing member is circular.

3. An apparatus as in claim 1 wherein said stationary target element is further provided with a target pattern on its surface.

4. An apparatus as in claim 3 wherein said target pattern comprises a series of concentric rings intersected by vertical and horizontal cross-hairs.

5. An apparatus as in claim 3; wherein, the material from which the stationary target element is fabricated is chosen from a class of materials: capable of distortion free passage of a focused laser beam; and, capable of being infused with a color;.

6. An apparatus as in claim 5; wherein the color of the material from which the stationary target element is fabricated is purple.

7. An apparatus as in claim 1; wherein, the adjustable target element is provided with releasable locking means for securing the adjustable target element at various locations along the vertical length of said open framework member.

8. An apparatus as in claim 7; wherein, the adjustable target element is provided with at least one horizontally disposed reference line.

9. An apparatus as in claim 8; wherein the material from which the adjustable target element is fabricated is chosen from a class of materials: capable of distortion free passage of a focused laser beam; and, capable of being infused with a color.

10. An apparatus as in claim 9; wherein, the color of the material from which the adjustable target element is fabricated is purple.

11. A method of excavating a grade to accommodate the desired height and direction of the longitudinal axis of a pipe string comprising the steps of:
(a) placing a centerline target unit comprising a stationary target element having a target pattern on its surface within a representative section of pipe whereby the center of the centerline target unit closely approximates the longitudinal axis of the representative section of pipe;
(b) placing the representative section of pipe containing the centerline target unit on support means whereby the longitudinal axis of the representative section of pipe is disposed at the desired height and direction of the longitudinal axis of the pipe string;
(c) positioning a laser beam generating device such that the generated laser beam will transcribe the desired length and direction of the longitudinal axis of the pipe string;
(d) bringing the impingment of the laser beam into close coincidence with the center of the centerline target unit;
(e) taking a grade checker unit comprising an elongated open framework element having an adjustable target element mounted thereon, and further having a generally horizontally disposed foot portion on the bottom surface and indicia representative of length on the vertical sides of the open framework element and adjusting the target element such that at least one horizontal line on the target element is disposed at a selected distance from the foot portion on the bottom surface of said framework element, wherein the selected distance represents the required depth of excavation relative to a location on the representative pipe section;
(f) moving the grade checker unit at spaced locations along the path of the generated laser beam such that when the foot portion of the open framework element is resting on the ground, the impringement of the laser beam on the adjustable target element relative to the at least one horizontal line will give the operator of excavating equipment a visual indication of the proximity of the excavation to the desired grade.

12. A method of excavating a grade to accommodate the desired height and direction of the longitudinal axis of a pipe string comprising the steps of:
(a) placing a centerline target unit comprising a stationary target element having a target pattern on its surface within a representative section of pipe whereby the center of the centerline target unit closely approximates the longitudinal axis of the representative section of pipe;
(b) positioning a laser beam generating device such that the generated laser beam will transcribe the desired height and direction of the longitudinal axis of the pipe string;
(c) placing the representative section of pipe containing the centerline target unit on support means whereby the longitudinal axis of the representative section of pipe is disposed at the desired height and direction of the longitudinal axis of the pipe string;
(d) bringing the impingment of the laser beam into close coincidence with the center of the centerline target unit;
(e) taking a grade checker unit comprising an elongated open framework element having an adjustable target element mounted thereon, and further having a generally horizontally disposed foot portion on the bottom surface indicia representative of length on the vertical sides of the open framework element and adjusting the target element such that at least one horizontal line on the target element is disposed at a selected distance from the foot portion on the bottom surface of said framework element, wherein the selected distance represents the required depth of excavation relative to a location on the representative pipe section;
(f) moving the grade checker unit at spaced locations along the path of the generated laser beam such that when the foot portion of the open framework element is resting on the ground, the impingment of the laser beam on the adjustable target element relative to the at least one horizontal line will give the operator of excavating equipment a visual indication of the proximity of the excavation to the desired grade.

* * * * *